United States Patent
Dragon et al.

(10) Patent No.: US 8,212,724 B2
(45) Date of Patent: Jul. 3, 2012

(54) POSITION INDICATING PROCESS

(75) Inventors: Dieter Dragon, Aichach (DE); Maik Middendorf, Munich (DE); Andre Nuckelt, Ottobrunn (DE)

(73) Assignee: Astrium GmbH, Taufkirchen (DE)

( * ) Notice: Subject to any disclaimer, the term of this patent is extended or adjusted under 35 U.S.C. 154(b) by 202 days.

(21) Appl. No.: 12/575,247

(22) Filed: Oct. 7, 2009

(65) Prior Publication Data

US 2010/0091820 A1    Apr. 15, 2010

(30) Foreign Application Priority Data

Oct. 8, 2008   (DE) .......................... 10 2008 050 455

(51) Int. Cl.
*G01S 3/02* (2006.01)
(52) U.S. Cl. ........................ 342/464; 375/144
(58) Field of Classification Search .......... 342/463–465; 375/144
See application file for complete search history.

(56) References Cited

U.S. PATENT DOCUMENTS

| | | | |
|---|---|---|---|
| 5,199,047 A | 3/1993 | Koch | |
| 7,174,141 B2* | 2/2007 | Green et al. | ............... 455/161.3 |
| 7,411,937 B2 | 8/2008 | Guilford | |
| 2004/0012524 A1* | 1/2004 | Couronne et al. | ............ 342/387 |
| 2004/0229637 A1 | 11/2004 | Wang et al. | |
| 2005/0273197 A1 | 12/2005 | Glenn et al. | |
| 2008/0181323 A1* | 7/2008 | Waters et al. | ................. 375/260 |

FOREIGN PATENT DOCUMENTS

| | | |
|---|---|---|
| DE | 10 2004 025 129 A1 | 12/2005 |
| DE | 60 2004 004 409 T2 | 10/2007 |
| EP | 0 428 199 | 5/1991 |
| GB | 2 404 124 A | 1/2005 |

OTHER PUBLICATIONS

Thomä, R. S. et al., "UWB Sensor Networks for Position Location and Imaging of Objects and Environments", EUCAP2007, Nov. 11-16, 2007, Edinburg, UK, pp. 1-9.
European Search Report with partial translation dated Sep. 21, 2010 (eleven (11) pages).
Zhao et al., Super-resolution TOA Estimation in OFDM Systems for Indoor Environments, Proceedings of the 2007 IEEE International Conference on Networking, Sensing and Control, Apr. 2007, pp. 723-728, London, UK.
Reddy et al., An Improved Time-of-Arrival Estimation for WLAN-Based Local Positioning, Embedded Systems Research Group, Tata Consultancy Services, Bangalore, India, $2^{nd}$ International Conference, Jan. 2007, five pages.
Falsi et al., Time of Arrival Estimation for UWB Localizers in Realistic Environments, EURASIP Journal on Applied Signal Processing, 2006, pp. 1-13, vol. 2006, Hindawi Publlshing Corporation.
Fang et al., A Novel Algorithm for Multipath Fingerprinting in Indoor WLAN Environments, IEEE Transactions on Wireless Communications, Sep. 2008, pp. 3579-3588, vol. 7, No. 9.

(Continued)

*Primary Examiner* — Thomas Tarcza
*Assistant Examiner* — Nga X Nguyen
(74) *Attorney, Agent, or Firm* — Crowell & Moring LLP

(57) ABSTRACT

A position indicating process includes the steps of receiving at least four radio signals emitted by different transmitter stations; determining a channel pulse response of the transmission channel for each of the received radio signals; estimating the direct signal path for each of the received radio signals based on the respectively determined channel pulse response; and determining the receiving position of the radio signals by evaluating the estimated direct signal paths of the received radio signals.

15 Claims, 7 Drawing Sheets

OTHER PUBLICATIONS

Kim et al., Low Complexity Ranging Algorithm Based on TOA for IEEE 802.15.4a system, Military Communications Conference, pp. 1-5, Nov. 2008, N.J.

Gezici et al., Position Estimation via Ultra-Wide-Band Signals, Proceedings of the IEEE, Feb. 2009, pp. 386-403, vol. 97, No. 2.

* cited by examiner

POSITION INDICATING PROCESS

BACKGROUND AND SUMMARY OF THE INVENTION

This application claims the priority of German patent document no. 102008050455.6-55, filed Oct. 8, 2008, the disclosure of which is expressly incorporated by reference herein.

The invention relates to a position indicating process which is suitable for a use in environments that are conducive to multipath propagation of signals.

Satellite navigation systems that are currently available for the purpose of position indicating offer a relatively precise determination of the position of a receiver. However, the receiver requires satellite signals that are as free of interferences as possible. A significant source of such interference, which occurs in certain environments (for example, in cities, inside buildings or in the mountains) is the multipath propagation of satellite signals. In those environments that favor multipath propagation of satellite signals, it is frequently not possible to receive signals without interference, and thus to ensure a precise position indication.

It is therefore an object of the present invention to provide a position indicating process which is particularly suitable for a use in environments that are conducive to multipath propagation of signals.

This and other objects and advantages are achieved by the method and apparatus according to the invention, in which a channel pulse response is determined for the transmission channel of a radio signal (also called a ranging signal) which is provided for position indicating, and which is interfered with by multipath propagation. Based on the channel pulse response, the direct signal path can be estimated, and can then be evaluated for a relatively precise position indication of a receiver of the signal.

In other words, from the plurality of propagation paths of a ranging signal through an environment that fosters multipath propagation, the propagation path which is most likely to correspond to the direct signal path from the transmitter to the receiver can be determined by estimation. As a result, the distance between the transmitter and the receiver can be determined based on signal propagation times. If coordinates of the transmitter are known, with at least four ranging signals from different transmitters (analogous to the satellite navigation), the position of the receiver can be determined very precisely. With a sufficient number of ranging signals, the position computation can make a three-dimensional determination, which permits an indicating of the position, for example, in large multifloor buildings.

According to one embodiment of the invention, a position indicating process includes the following steps:
 receiving at least four radio signals emitted by different transmitter stations;
 determining a channel pulse response of the transmission channel for each of the received radio signals;
 estimating the direct signal path for each of the received radio signals by means of the respectively determined channel pulse response; and
 determining the receiving position of the radio signals by evaluating the estimated direct signal paths of the received radio signals.

The radio signals emitted by the different transmitter stations may be identical except for their carrier frequencies, which may differ by a frequency offset. This simplifies generating the signals, because costly encoding of the radio signals is not required for differentiation by a receiver.

The reception of the radio signals may comprise the following steps:
 band-pass filtering of each radio signal;
 mixing each band-pass-filtered radio signal down to its corresponding baseband;
 low-pass filtering of each mixed-down radio signal;
 digitizing each low-pass-filtered radio signal;
 transforming each digitized radio signal to the frequency range by means of a fast Fourier transformation (FFT);
 extracting individual complex FFT components from the radio signals transformed to the frequency range; and
 removing phase shifts from the extracted complex FFT components.

The channel pulse response may be determined by comparing each received radio signal with an individual undistorted transmitter radio signal copy in the frequency range, and calculating the channel pulse response based on the comparison. For this purpose, replicas of undistorted transmitter radio signals, determined, for example, by measurements, can be filed in a receiver before the start of the operation.

The direct signal path may be estimated by processing the determined channel pulse response using a state space estimation algorithm by means of which the determined channel pulse response is modeled by a finite sum of complex sine functions. Modeling takes place by a parameter estimation in the frequency range.

The direct signal path can be estimated by evaluating the modeled channel pulse response during which the first propagation time component is extracted from the modeled channel pulse response. As a rule, the first propagation time component corresponds relatively precisely to the line-of-sight (LOS) component of the channel pulse response, and therefore to the direct signal path.

The receiving position can be determined by a propagation time difference (Time Difference of Arrival—TDOA) computation using the estimated direct signal paths of each of the received radio signals. In the case of the TDOA, the different arrival times of an impulse emitted isochronously by several transmitters are analyzed for the position indication.

The transmitter stations can emit the radio signals in a synchronized manner. As a result, it can be ensured that TDOA computations lead to meaningful results.

For synchronizing the emission, a pulse-per-second (PPS) signal and/or a 10 MHz signal can be used. A PPS signal is a signal that relatively accurately can signal the start of a second. PPS signals are frequently emitted by precision clocks, such as those of some receivers for satellite navigation signals.

The PPS signal and/or the 10 MHz signal can be continuously readjusted within the phase at a preset repetition rate of (particularly, 10 Hz) in order to ensure a durable synchronization.

According to a further embodiment of the invention, a transmitter station, which is configured to implement the invention and as explained above, and has the following:
 a synchronization unit for emitting and receiving synchronization signals to and from respective transmitter stations;
 a signal generator for generating a ranging signal; and
 a communication module for emitting the ranging signal as a radio signal for the position indication of a receiver.

Furthermore, an embodiment of the invention provides an arrangement of several transmitter stations according to the invention and as described above, each transmitter station having a line of sight to at least one other transmitter station.

Finally, an embodiment of the invention relates to a position indicating system which is configured to perform the process according to the invention as described above, and has the following:
- a bandpass filter for filtering each received radio signal emitted by a transmitter station;
- a mixer for mixing down each bandpass-filtered radio signal into its corresponding baseband;
- a low-pass filter for filtering of each mixed-down radio signal;
- an analog-to-digital converter for digitizing each low-pass-filtered radio signal; and
- a processing unit for transforming each digitized radio signal into the frequency range by means of fast Fourier transformation FFT, extracting individual complex FFT components from the radio signals transformed into the frequency range, and removing phase shifts from the extracted complex FFT components.

The position indicating system can be implemented, for example, in the form of a navigation device. Such a navigation device may also be designed for the reception of navigation signals of a global satellite navigation system. As a result, for example, position indicating in the terrain as well as in buildings, in the inner-city region and in the mountains can be carried out in a reliable and mainly also relatively precise manner.

Other objects, advantages and novel features of the present invention will become apparent from the following detailed description of the invention when considered in conjunction with the accompanying drawings.

BRIEF DESCRIPTION OF THE DRAWINGS

In the description, in the claims, in the abstract and in the drawings, the terms and assigned reference symbols will be used which are used in the attached list of reference symbols.

DETAILED DESCRIPTION OF THE DRAWINGS

In the following, identical and/or functionally identically elements may be provided with the same reference symbols.

In the following, the present invention will be described by means of a Multi Channel Sounding (MCS) network having several MCS transmitters. The mobile MCS receivers may be situated between the MCS transmitters, at positions determined based on estimated channel pulse responses. Briefly summarized, the mutually autonomous MCS receivers receive an individual multi channel signal for each MCS transmitter and then, per transmission link, form a channel transmission function together with the replica signal contained in the MCS receiver and the digitized MCS signal. One channel transmission function is available for each MCS transmitter.

The individual channel transmission functions are evaluated using a state space estimation algorithm. It is the task of the estimator to extract the direct signal path from the MCS signal. A 3-dimensional position calculation of the MCS receiver can be determined by analyzing at least 4 channel transmission functions by means of TDOA.

Figure 1:
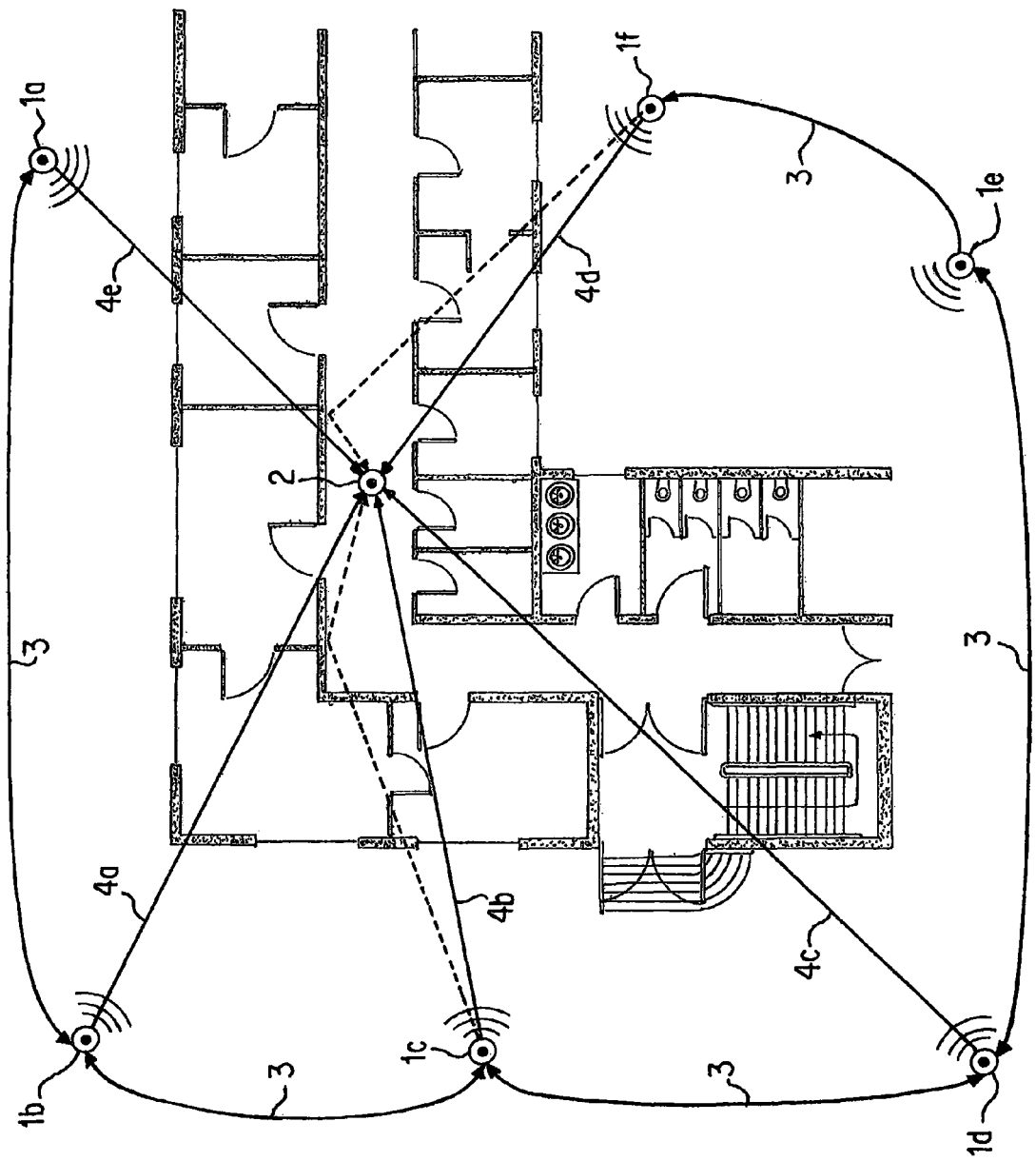
FIG. 1 is a top view of an embodiment of an arrangement of six transmitter stations around a building complex, and of a position indicating system according to the invention.

The following is a detailed description of the method of operation of the present invention by means of embodiments. Initially, at least four transmitter stations are placed around a building complex. FIG. 1 shows an arrangement of a total of six transmitter stations $1a$-$1f$ around a building. The transmitter stations $1a$-$1f$ have the following elements. (A detailed construction of a transmitter station according to the invention will be explained below by means of the block diagram illustrated in FIG. 4.)
- GPS receiver
- synchronization unit
- signal generator for generating a ranging signal
- radio communication module
- power supply unit.

The transmitter stations are set up such that the first transmitter station $1a$ has direct line of sight to the second transmitter station $1b$. The same applies to the second $1b$ and the third $1c$, the third $1c$ and the fourth $1d$, the fourth $1d$ and the fifth $1e$ transmitter stations, etc. As a result, a mutual synchronization of the transmitter stations can be achieved that is free of problems. The initialization phase can start after the transmitter stations $1a$-$1f$ have been placed. This phase can be outlined as follows:

1. First, the GPS receivers in each transmitter stations $1a$-$1e$ are activated in order to determine the relative position of all transmitter stations with respect to one another. On the basis of the determined relative positions, a local coordinate system is spanned in 3 dimensions, which coordinate system is used for the position indicating of a receiver.

2. Then the synchronization modules are activated in each transmitter station $1a$ -$1f$. For the synchronization of the ranging signals $4a$ -$4e$ emitted by the transmitter stations $1a$ -$1f$, a 1PPS signal and a 10 MHz signal are available. In FIG. 1, the synchronization is described by the radio links 3. After a fixed transient time, synchronized reference signals in the sub-nanosecond range will be available at each transmitter station $1a$-$1f$. These reference signals ensure in each transmitter stations $1a$ -$1f$ that all transmitter stations will be able to emit their ranging signals $4a$ -$4e$ at the same point in time. The PPS signal and the 10 MHz are continuously readjusted at a repetition rate of approximately 10 Hz within the phase (free of phase shifts) so that a durable mutual synchronization of the transmitter stations is guaranteed.

3. After successful passage through Points 1-2, the ranging signals $4a$ -$4e$ are activated in each transmitter stations $1a$ -$1f$ by way of the synchronized PPS pulse, and are emitted by the radio communication module as radio signals. Each ranging signal $4a$ -$4e$ is a continuously emitted multichannel (MC) signal. Each ranging signal $4a$-$4e$ is a continuously emitted multichannel (MC) signal.

After a one-time initialization phase (Points 1-3) and starting from the situation that a receiver 2 is situated in the spanned coordinate system, the following process sequence takes place for the position indicating.

Figure 2:
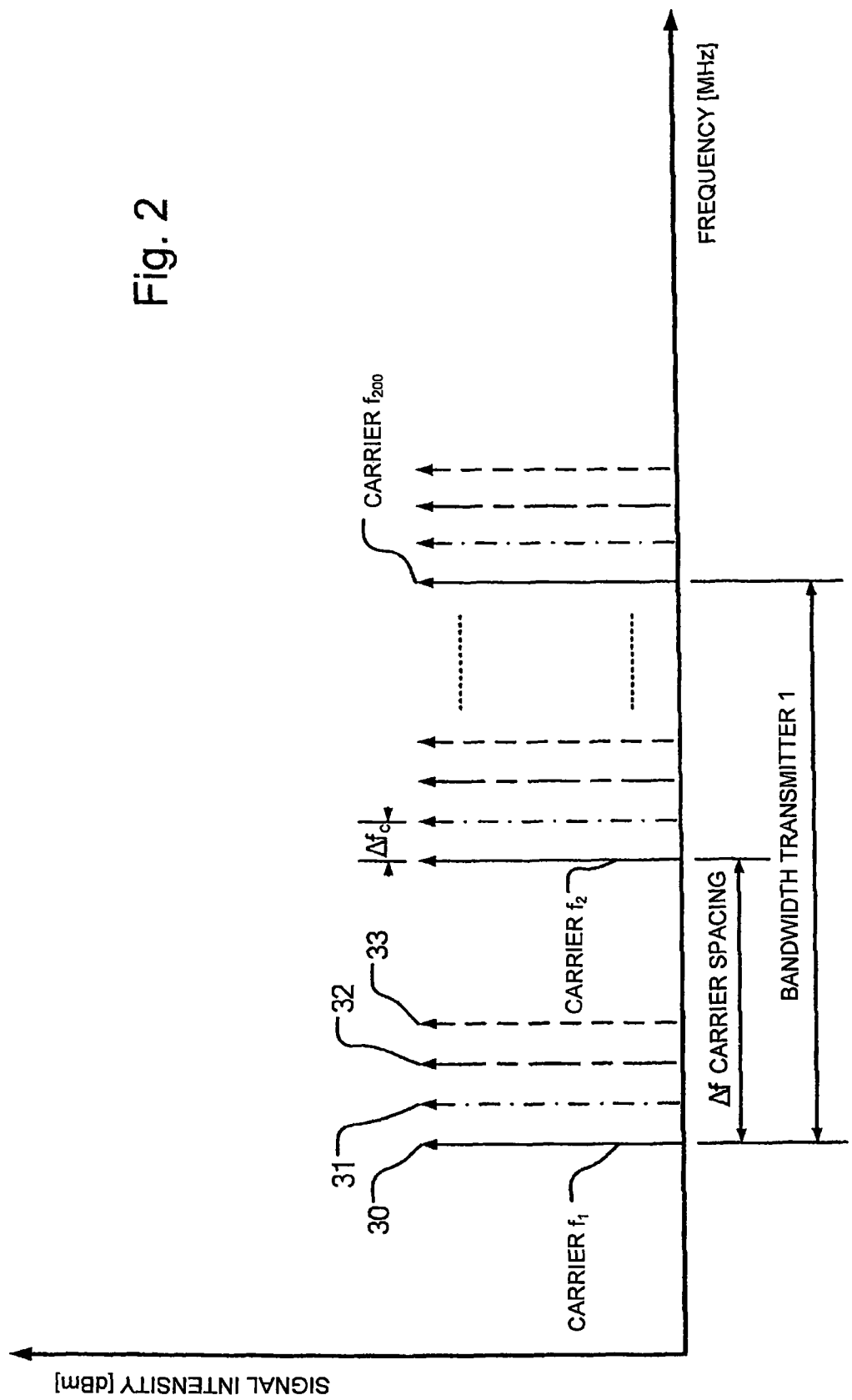
FIG. 2 is a view of the frequency spectrum with the frequency ranges occupied by the transmitter stations for the emitted radio signals.

1. In the case of a number of, for example, four transmitter stations, four MC signals are received in the receiver, which differ from one another in that their carrier frequencies have a frequency offset of Δfc. FIG. 2 shows the four MC signals 30-33 in the frequency range. In this case, the transmit bandwidth of a transmitter station extends over a large frequency range, as indicated in FIG. 2; i.e., a transmitter station can emit MC signals with different carrier frequencies f1 to f200 in the transmit frequency range.

2. Each MC signal is first bandpass-filtered in the receiver 2 and is then adapted by way of an automatic gain control (AGC) to the maximum input level of a mixer connected on the output side.

3. In the mixer, each MC signal is mixed down into the baseband, and is subsequently low-pass filtered.

4. Each filtered low-pass signal is converted from analog to digital, and is stored in $2^N$ large blocks.

5. Each individual $2^N$ data record is transformed into the frequency range by means of fast Fourier transformation (FFT). The individual complex FFT amplitudes are extracted from the data and are freed of an artificial randomly distributed phase shift impressed in the transmitter station.

6. In the receiver 2, the undistorted replicas of all participating transmitter stations are stored. These are used for determining the channel response of the individual communication links between the transmitter stations and the receiver 2 in the frequency range.

7. After the computation of the channel responses, the latter are each modeled by means of a state space estimation algorithm by a finite sum of complex sine functions. A modeling takes place by a parameter estimation in the frequency range.

8. The estimator supplies a high-resolution version of the channel pulse response from each participating transmission channel with all its line-of-sight (LOS) components and all multipath components as a result.

9. The first propagation time component (as a rule the LOS component) will then be extracted. In the case of four transmitter stations, a total of six TDOA differences can be computed.

10. A 2D position can now be determined by a numerical solution (Taylor's series) of the hyperbolic system of equation, as known, for example, for the position indicating by satellite navigation systems.

Figure 3:
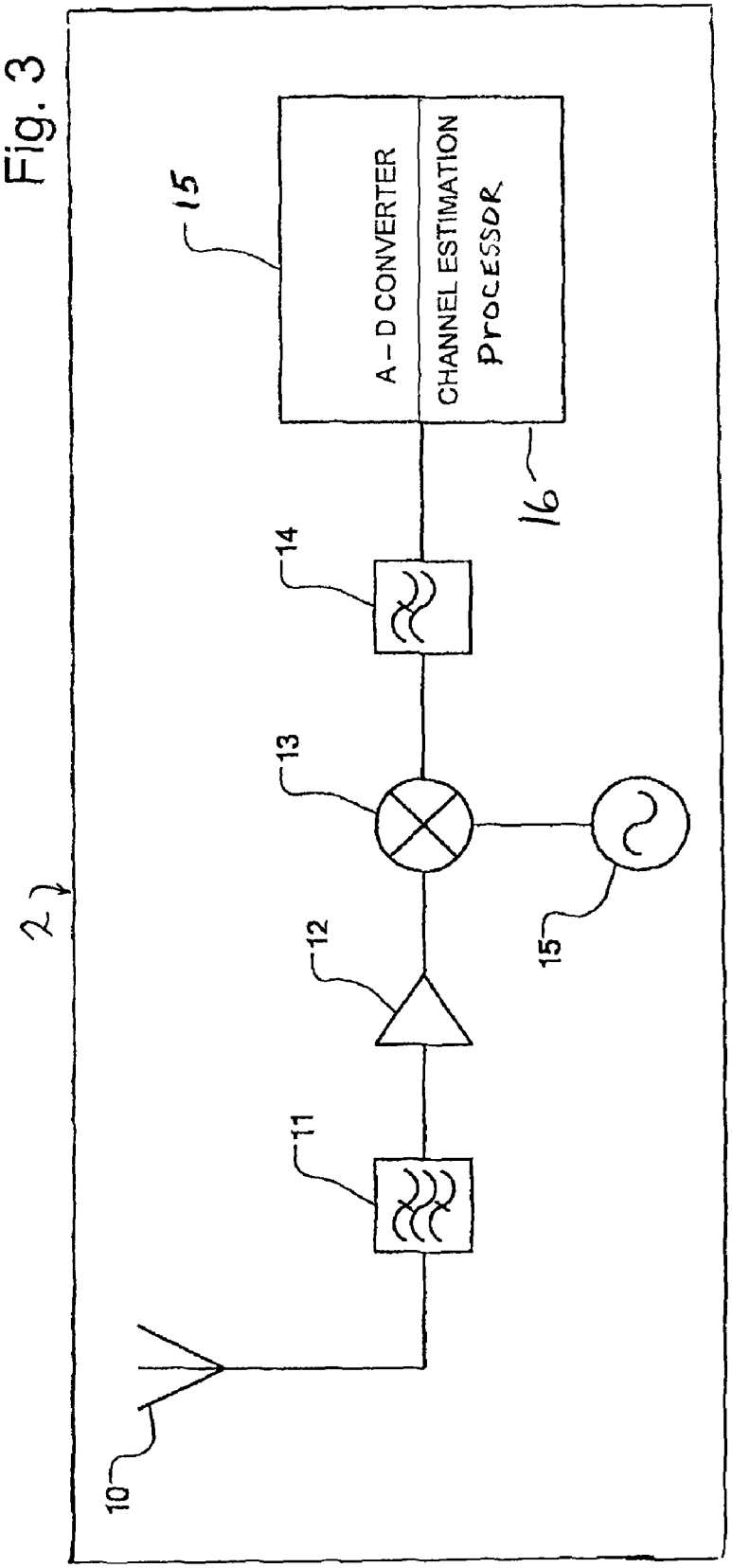
FIG. 3 is a block diagram of an embodiment of a position indicating system according to the invention.

FIG. 3 is a block diagram that illustrates the construction of a receiver of a position indicating system according to the invention, which has an antenna 10 for receiving MC signals. A received MC signal is first fed to a bandpass filter which is followed by an AGC 12, in order to adapt the amplitude of the bandpass-filtered receiving signal to a mixer 13 which mixes the bandpass-filtered signal using the signal of a signal source 15 down into the baseband. Subsequently, the mixed-down signal is fed to a low-pass filter 14 before it is digitized by an analog-to-digital converter 15 and is fed to a channel estimator 16 for further processing. The channel estimator essentially carries out the above-explained Steps 4-9 and can be implemented particularly by a correspondingly programmed processor 16. As a result, the TDOA components are obtained from the received signals which can be used for the precise position indicating.

Figure 4:
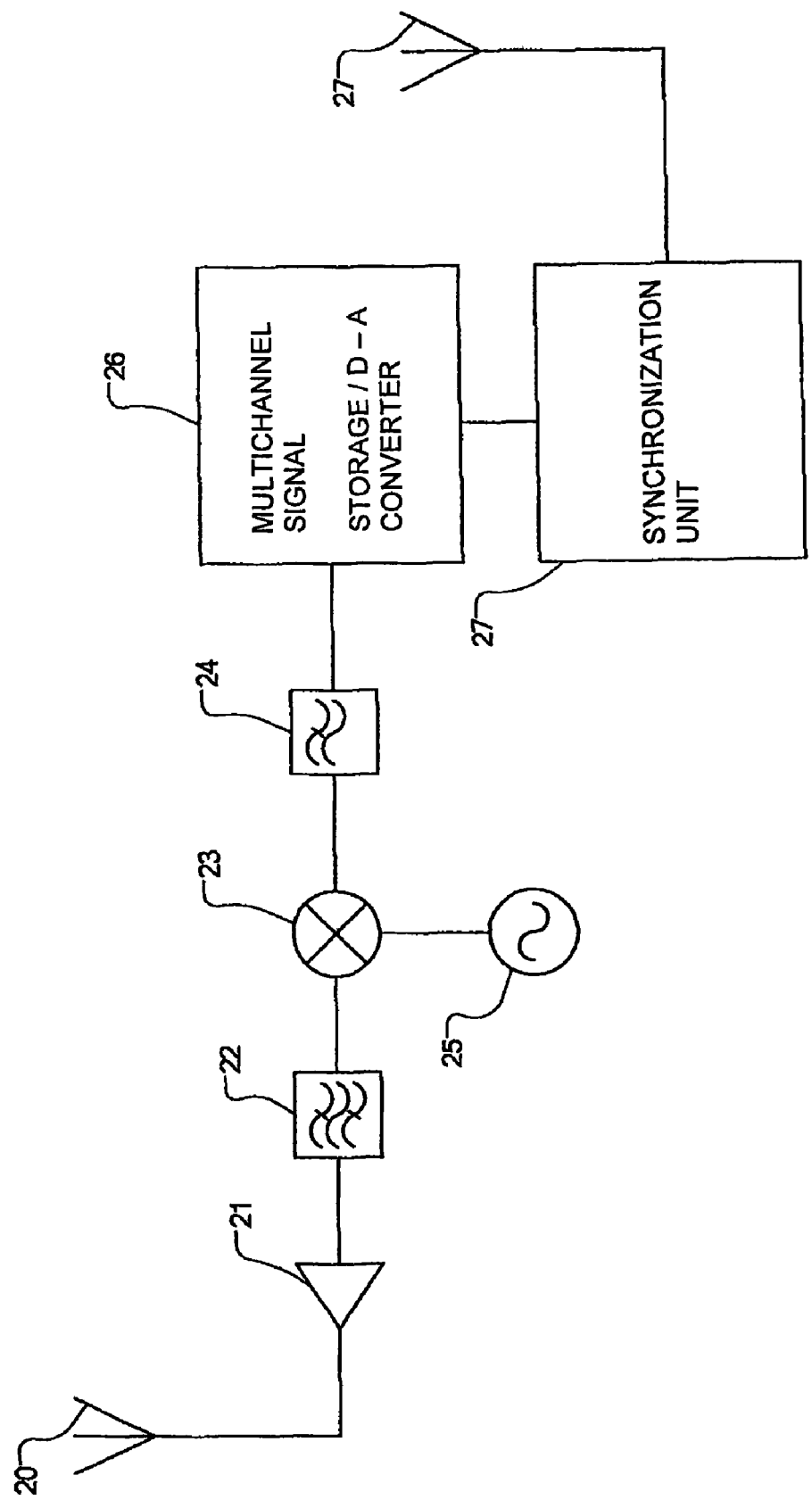
FIG. 4 is a block diagram of an embodiment of a transmitter station according to the invention.

FIG. 4 is a block diagram which shows the construction of a transmitter station according to the invention. A synchronization unit with the antenna 27 is used to synchronize the emission of ranging signals with other transmitter stations. A multichannel signal storage and digital-to-analog converter unit 26 generates a position finding signal of the transmitter station by selecting a suitable multichannel signal from a memory in which several multichannel signals are stored. The selected digital multichannel signal is then converted to an analog signal, fed to a low-pass filter 24 and, after the low-pass filtering, mixed by means of a mixer 23 and a signal source 25 into the frequency range which is provided for the transmission. The highly mixed signal is then fed to a bandpass filter 22 followed by a transmit amplifier 21. The amplified signal is emitted by way of an antenna 20 as a ranging signal of the transmitter station by radio.

Figure 5:
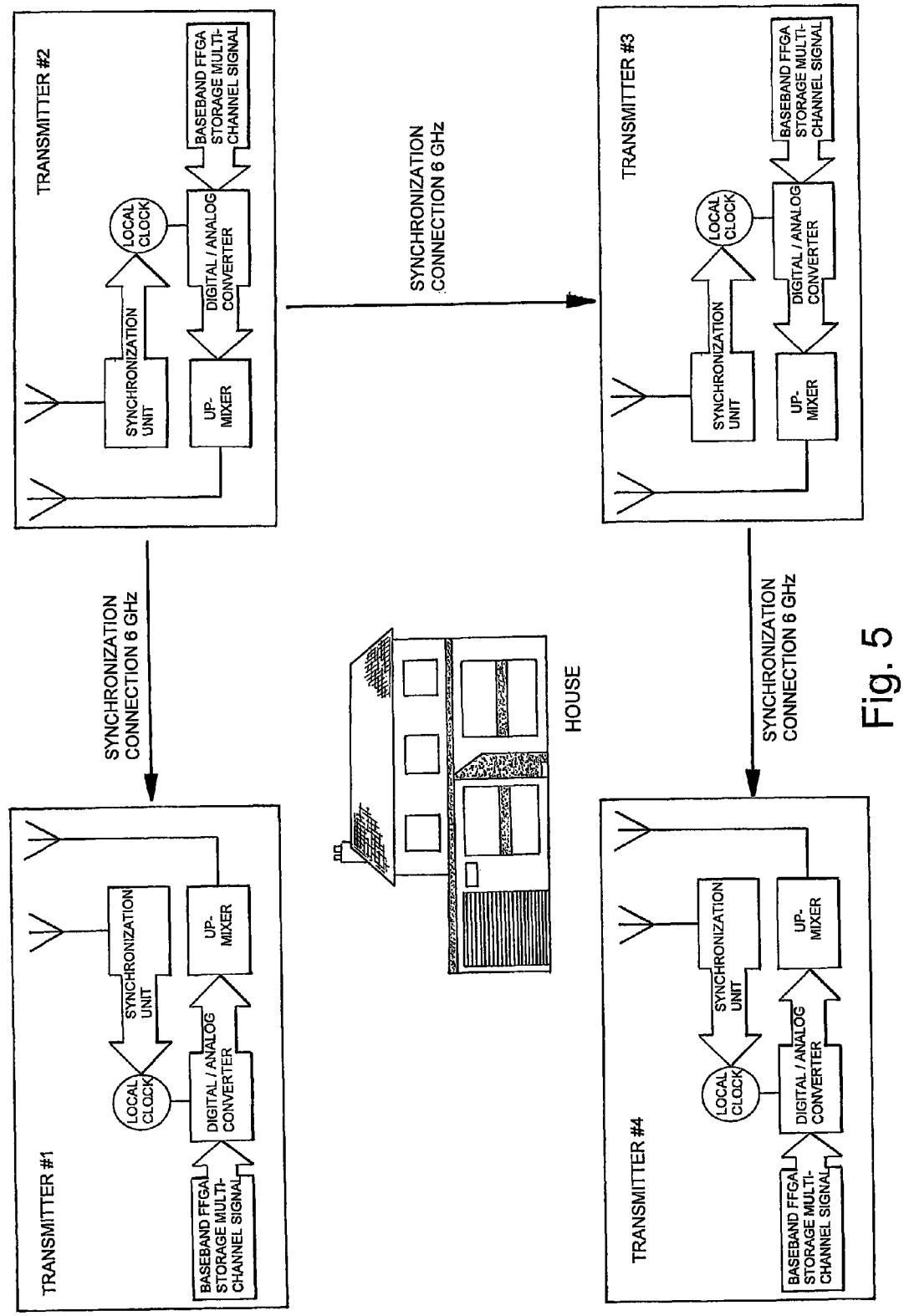
FIG. 5 shows an arrangement of transmitter stations, and the synchronization connections between the individual stations according to the invention.

FIG. 5 illustrates the synchronization of four transmitter stations #1-#4 via 6 GHz radio synchronization connections. Transmitter station #2 transmits synchronization signals to the transmitter stations #1 and #3, with which it has a line of sight connection. Transmitter station #3 transmits a synchronization signal to transmitter station #4, with which only the latter has a line of sight connection.

Figure 6:
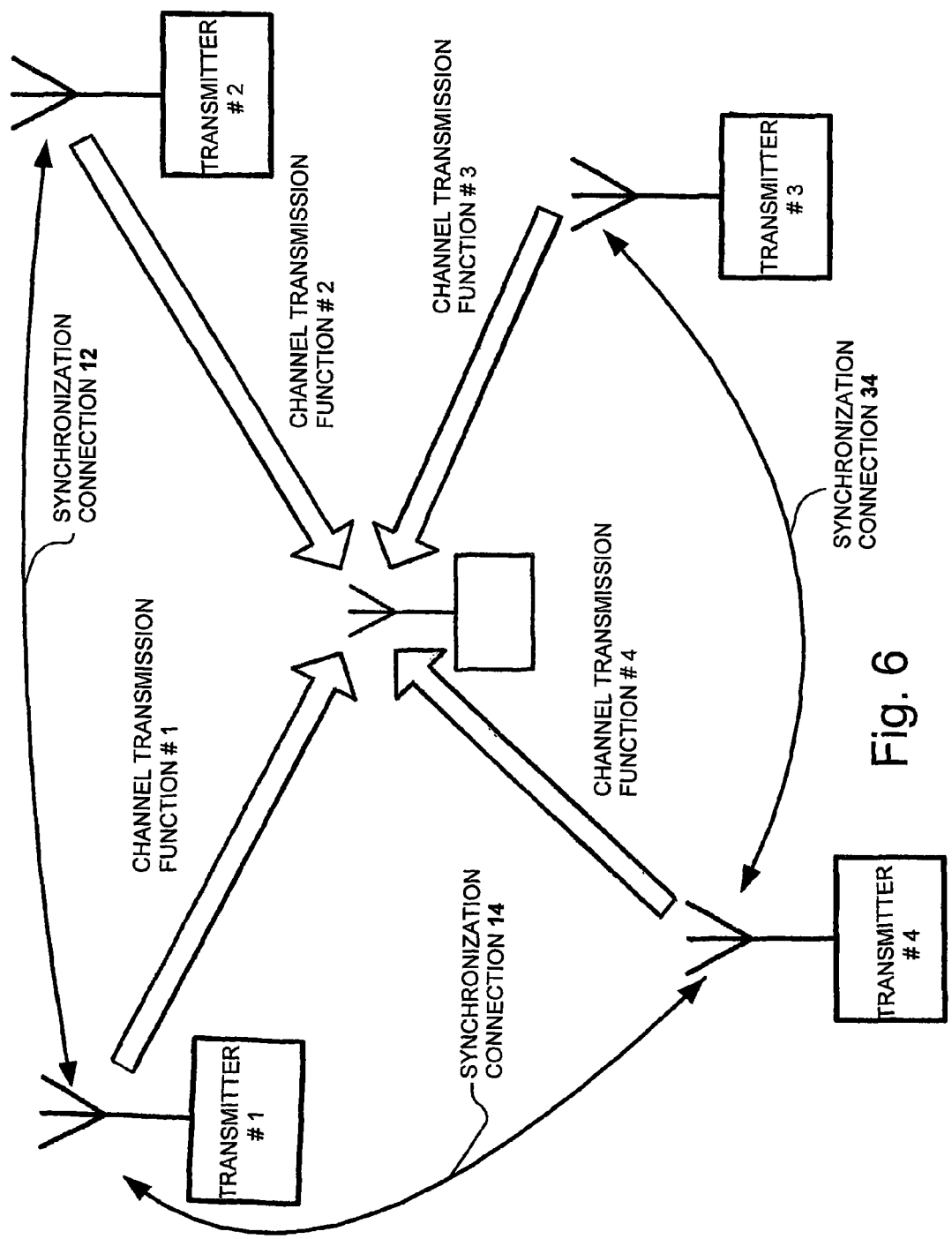
FIG. 6 is a schematic representation of the individual radio connections in an arrangement for position indicating having transmitter stations and a position indicating system according to the invention.

FIG. 6 illustrates a further synchronization situation in which the transmitter stations #1 and #2, #1 and #4 as well as #4 and #3 synchronize one another, in each case by way of synchronization connections 12, 14 and 34 respectively. In each case, each transmitter station #1-#4 has a channel transmission function #1-#4 with the receiver #1.

Figure 7:
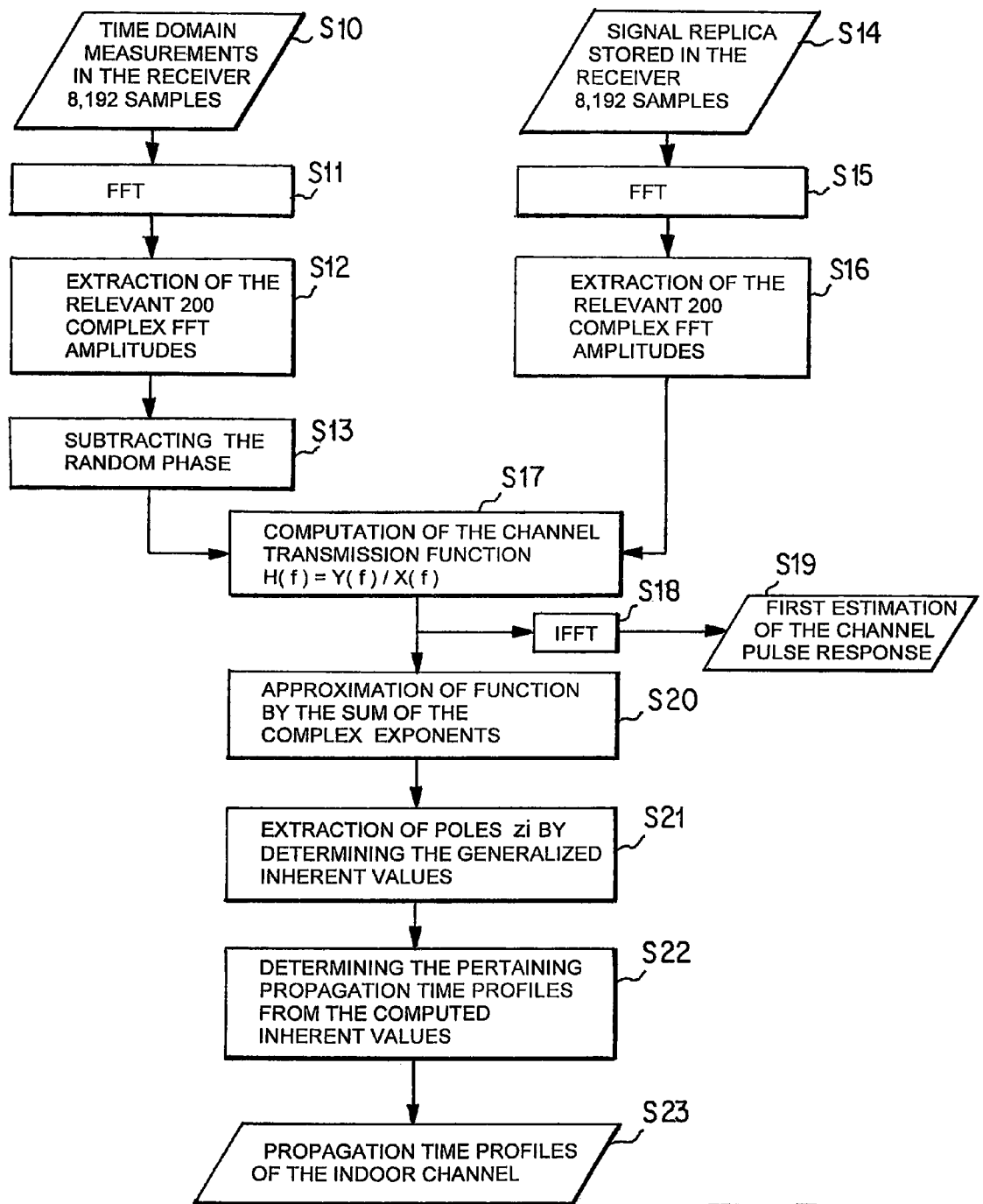
FIG. 7 is a flow chart which shows the determination of the channel pulse response between a transmitter station and a position indicating system according to the invention.

FIG. 7 is a flow chart which illustrates the determination of the channel pulse response between a transceiver station and a position indicating system according to the invention. The flow chart shows an algorithm which can be implemented, for example, in a receiver in the form of software.

In Step S10, the receiving signal is measured in the time domain, with 8,192 samples per time-measuring unit. In the subsequent step S11, the measurement represented by the samples in the time domain is transformed into the frequency domain, using a fast Fourier transform (FFT), and in Step S12, 200 relevant complex FFT amplitudes are extracted from the transformed samples. Then, in Step S13, randomly distributed phase shifts are removed from the extracted complex FFT amplitudes.

In Step S14, 8,192 samples of a stored undistorted replica position-finding signal (thus, of a signal copy of a ranging signal transmitted in an undistorted manner) are loaded and transformed by means of FFT into the frequency range in Step S15. Analogous to Step S12, 200 relevant complex FFT amplitudes are selected in Step S16.

As a result, two sets of samples will now be available for computing the channel transmission function $H(f)=Y(f)/X(f)$ in Step S17. By means of an inverse FFT (IFFT), the computed channel transmission function $H(f)$ is transformed into the time domain in Step S18, and a first estimation of a channel pulse response is thereby carried out in Step S19. Subsequently, in Step S20, the channel transmission function $H(f)$ is approximated by a sum of complex exponential functions. In the next Step S21, poles $z_i$ are extracted by solving generalized inherent values. The exceeded delay profile is extracted from the computed inherent values in Step S22. Finally, in Step S23, the time delay profile of the transmission channel is obtained in the interior area, which time delay profile can be used for the TDOA computation.

The invention permits not only a position indication in environments which promote multipath propagation of signals, but also the formation of a building navigation system which, from the users' points of view, is a purely passive system and thereby allows an almost unlimited number of users. Furthermore, the invention makes it possible to obtain a navigation system that is based on the ad-hoc principle, and essentially requires only the setting-up of system transmitter stations and starting the operation of the transmitter stations, in order to permit an immediate navigation by receiving and evaluating the signals of the transmitter stations. It is, for example, conceivable to construct a navigation system in a large building, which navigation system can be utilized by users as a supplement to the satellite navigation system. In addition, a system according to the invention can be operated autonomously, because it does not depend on an existing infrastructure or on an infrastructure that must be installed beforehand at high expenditures.

In particular, the following work was carried out within the scope of the implementation of the present invention:
- design of the (multichannel) navigation signals of the transmitters of an MCS (Multi Channel Sounding) network;
- application of state space estimation algorithms for determining the channel transmission functions;
- computation of positions based on propagation time differences, derived from the channel transmission functions; and
- application of filtering techniques for improving the position computation of a dynamic receiver.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE SYMBOLS 1a-1f (Signal) transmitter station
2 (Signal) receiver
3 Synchronization connections of transmitter stations 1a-1e
4a-4e Ranging signals of transmitter stations 1a-1e
30-33 Frequency spectrums of the ranging signals
10 Antenna
11 Bandpass filter
12 AGC
13 Mixer
14 Low-pass filter
15 Signal source
16 ADC and channel estimation
20 Antenna
21 Amplifier
22 Bandpass filter
23 Mixer
24 Low-pass filter
25 Signal source
26 Multichannel signal storage and DAC
27 Synchronization unit with antenna
S10-S23 Process steps

What is claimed is:

1. A position indicating process comprising:
    a receiver receiving at least four radio signals emitted by different transmitter stations via respective different transmission channels;
    determining a channel pulse response of the transmission channel for each of the received radio signals;
    estimating a direct signal path for each of the received radio signals based on the respective determined channel pulse responses; and
    determining a receiving position of the receiver by evaluating the estimated direct signal paths of the received radio signals.

2. The process according to claim 1, wherein the radio signals emitted by the different transmitter stations are identical, except that their carrier frequencies differ by a frequency offset $\Delta f_c$.

3. The process according to claim 1, wherein:
    the radio signal of each transmission channel has a respective frequency range; and
    the step of receiving the radio signals comprises,
        bandpass-filtering each radio signal;
        mixing each bandpass-filtered radio signal down into its corresponding baseband;
        low-pass filtering each mixed-down radio signal;
        digitizing each low-pass-filtered radio signal;
        transforming each digitized radio signal into its frequency range by means of fast Fourier transformation FFT;
        extracting individual complex FFT components from the radio signals transformed into the frequency range; and
        removing phase shifts from the extracted complex FFT components.

4. The process according to claim 1, wherein :
    the determination of the channel pulse response comprises comparing each individual received radio signal with an individual undistorted transmitter radio signal copy in the frequency range of that individual received radio signal; and
    the channel pulse response is calculated based on the comparison.

5. The process according to claim 1, wherein the estimation of the direct signal path comprises processing of the determined channel pulse response by means of an estimation algorithm, based on a state space model.

6. The process according to claim 5, wherein:
    the estimation algorithm is a state space estimation algorithm by which the determined channel pulse response is modeled by a finite sum of complex sine functions; and
    the modeling is performed by parameter estimation in the frequency range.

7. The process according to claim 6, wherein estimation of the direct signal path comprises evaluating the modeled channel pulse response during which its first propagation time component is extracted from the modeled channel pulse response.

8. The process according to claim 1, wherein the determination of the receiving position comprises computation of a propagation time difference based on estimated direct signal paths of each of the received radio signals.

9. The process according to claim 1, wherein the transmitter stations emit the radio signals in a synchronized manner.

10. The process according to claim 9, wherein at least one of a pulse-per-second PPS signal and/or a 10 MHz signal is used for synchronizing the emission.

11. The process according to claim 10, wherein at least one of the PPS signal and the 10 MHz signal is continuously readjusted within the phase at a preset repetition rate in order to ensure a continuous synchronization.

12. The process according to claim 11, wherein the preset repetition rate is 10 Hz.

13. A transmitter station for performing the process according to claim 1, said transmitter station comprising:
- a synchronization unit for receiving and emitting synchronization signals from transmitter stations and to other transmitter stations respectively;
- a signal generator for generating a ranging signal; and
- a communication module for emitting the ranging signal as a radio signal for the position indication of a receiver.

14. An arrangement of several transmitter stations according to claim 13, in which each transmitter station has a line-of-sight connection to at least one other transmitter station.

15. A position indicating system comprising:
- a receiver for receiving radio signals emitted by transmitters in different frequency ranges, via respective different transmission channels;
- a bandpass filter for bandpass filtering of each received radio signal;
- a mixer for mixing down each bandpass-filtered radio signal into a corresponding baseband;
- a low-pass filter for the low-pass filtering of each mixed-down radio signal;
- an analog-to-digital converter for digitizing each low-pass-filtered radio signal; and
- a processing unit for transforming each digitized radio signal into its frequency range by means of fast Fourier transformation FFT, for extracting its individual complex FFT components, and for removing phase shifts from the extracted complex FFT components; wherein,
- said receiver receives at least four of said radio signals emitted by different transmitters;
- a channel pulse response is determined for the transmission channel of each received radio signal;
- a direct signal path is estimated for each received radio signal based on determined channel pulse responses; and
- the position of the receiver is determined by evaluating the estimated direct signal paths of the received radio signals.

* * * * *